United States Patent [19]

Mohn

[11] Patent Number: 4,500,263

[45] Date of Patent: Feb. 19, 1985

[54] ELECTRICALLY DRIVEN SUBMERSIBLE PUMP SYSTEM

[75] Inventor: Frank Mohn, London, England

[73] Assignee: Framo Developments (UK) Limited, London, England

[21] Appl. No.: 629,733

[22] Filed: Jul. 9, 1984

Related U.S. Application Data

[63] Continuation of Ser. No. 366,695, Apr. 8, 1982, abandoned.

[30] Foreign Application Priority Data

Apr. 10, 1981 [GB] United Kingdom ............... 8111368
Feb. 19, 1982 [GB] United Kingdom ............... 8204943

[51] Int. Cl.³ ............................................. F04B 39/06
[52] U.S. Cl. ............................. 417/360; 417/367; 417/422; 310/87; 310/71
[58] Field of Search ............... 417/360, 422, 367, 369, 417/373; 339/15, 16 R, 16 C, 94 R; 310/87, 71, 112, 54, 58, 59

[56] References Cited

U.S. PATENT DOCUMENTS

| | | |
|---|---|---|
| 2,000,716 | 5/1935 | Polk .............................. 339/15 UX |
| 2,423,436 | 7/1947 | Blom .............................. 310/87 UX |
| 2,506,827 | 5/1950 | Goodner . |
| 2,742,597 | 4/1956 | Penlington ..................... 310/87 X |
| 2,857,181 | 10/1958 | Myers . |
| 3,170,137 | 2/1965 | Brandt ........................... 339/16 R |
| 3,217,282 | 11/1965 | Chevalier ........................ 339/15 |
| 4,126,406 | 11/1978 | Traylor .......................... 310/87 X |

FOREIGN PATENT DOCUMENTS 2243027 3/1974 Fed. Rep. of Germany .

Primary Examiner—Richard E. Gluck
Attorney, Agent, or Firm—Young & Thompson

[57] ABSTRACT

An electrically powered submersible pump system has a pipe stack in which a dielectric oil is circulated within tubular electric power supply conductors, for which the oil provides insulation, down to the pump head to cool and lubricate the motor bearings. The oil is returned between the conductors and a surrounding cofferdam pipe. The liquid being pumped is guided in a duct between the cofferdam pipe and an outer load bearing pipe. The pipe stack is divisible into sections of convenient length, the conductors, the cofferdam pipe, and the outer pipe having releasable connector means at each end of each pipe stack section.

12 Claims, 5 Drawing Figures

ELECTRICALLY DRIVEN SUBMERSIBLE PUMP SYSTEM

This application is a continuation, of application Ser. No. 366,695, filed Apr. 18, 1982, now abandoned.

BACKGROUND OF THE INVENTION

Electrically driven submersible pump systems are used for example on off-shore installations, or within the cargo tanks of ships used for carrying oil and bulk chemicals for example. They comprise a pump head having a pumping section including an impeller and a motor chamber containing an electric motor for driving the impeller, a pipe stack arranged to be suspended from a support with the pump head carried at the lower end of the pipe stack, the pipe stack having a discharge duct for liquid pumped by the pump and electric supply conductors for supplying power to the electric motor.

It is a disadvantage of the prior art systems of this kind that the electric power to the motor in the pump head is conveyed by means of a stiff and heavy electric cable which adds to the difficulties of raising the pump head to the support level for maintenance and inspection.

Moreover, the cable of the prior art systems has to be protected by an outer pipe particularly when explosive liquids such as crude oils with a high vapour pressure are being pumped. If the cable is merely clamped to the cargo discharge pipe in the pipe stack, the cable experiences considerable wear and tear from chemical decomposition, and from mechanical forces such as waves when it is exposed to these. The electric power cable of the prior art systems provides no means for monitoring, at the deck or support level, the performance or condition of the pump head.

It is accordingly an object of the invention to provide a pipe stack for an electrically driven submersible pump system which can be readily assembled from separable pipe stack sections.

It is also an object of the invention to provide a pipe stack section detachably connectible to like or co-operating sections which has electrical conductors extending therealong with means for insulating the conductors by dielectric liquid.

It is a further object of the invention to provide a pipe stack section having liquid insulated electrical conductors extending therealong, the section structure providing protective means around the liquid insulated conductors.

It is an additional object of the invention to provide a submersible electrically driven pump system with a pipe stack in which dielectric liquid for insulating power supply conductors to the pump motor is circulated.

It is a further object of the invention to provide a submersible pump system in which circulation of a dielectric oil for insulating electrical power supply conductors to a pump motor is employed to lubricate bearings.

It is yet another object of the invention to provide a submersible pump system in which dielectric liquid for insulating electrical power supply conductors is circulated to a pump head and is employed to monitor and/or to modify (as by cooling) pump head performance.

SUMMARY OF THE INVENTION

The invention accordingly provides a pipe stack section which can be readily secured to and detached from other components in the pipe stack of a submersible pump system, the pipe stack section comprising pipe means defining a duct for guiding a fluid pumped by the system, electrical conductor means for conveying electrical power to the motor, and cofferdam pipe means for receiving dielectric liquid for insulation of the conductor means.

A pipe stack of a submersible pump system comprising sections in accordance with the invention can be readily assembled for use and can also be readily separated into its sections and re-assembled. Effecting insulation of the conductor means by a dielectric liquid which is introduced only when the pipe stack is completed eliminates the need to couple together an insulating medium through the various sections of the pipe stack. The use of low voltage power supplies, of the order of 660 volts, with advantages in respect of motor insulation, is facilitated.

The cofferdam pipe means advantageously provides a central core to the pipe stack, the discharge duct being between the pipe and an outer pipe of the pipe stack. Where the dielectric liquid is circulated, the conductors are preferably tubular and receive the pressure flow of the dielectric liquid, the return flow being between the conductors and the protection pipe.

The conductor means can comprise a plurality of tubular conductors extending side by side within the cofferdam pipe means or concentric conductors with solid dielectric therebetween, the ends of the conductors being relatively staggered at each end of the pipe section so that each conductor is slidably receivable within a respective conductor of a plurality of conductors of a co-operating pipe stack section of which the ends are relatively staggered in the contrary sense from those of the first-mentioned pipe stack section.

The invention also provides a submersible pump system comprising a pipe stack arranged to be suspended from a support with a pump head containing an impeller and an electric motor for driving the impeller at the lower end, the pipe stack having a discharge duct for liquid pumped by the impeller and electric supply conductors for supplying power to the electric motor, cofferdam pipe means for containing dielectric liquid providing insulation for the conductors and means for circulating the dielectric liquid. The pipe stack between the upper support and the pump head may be made up of one or more sections as described above.

The invention provides that the dielectric liquid can be circulated into the pump head, so that information about the condition of the pump head can be obtained from the condition of the dielectric liquid as circulated back to the support level. The dielectric liquid can thus indicate the pumphead operating temperature and the presence of any leaks in the dielectric liquid circuit.

Circulation of the dielectric liquid into the pump head permits the liquid to be employed for other than monitoring purposes. The dielectric liquid can be selected to have lubricating properties, and can be circulated within the motor chamber so as to lubricate the bearings it contains. Heat will then be removed from the pump head motor, and this can be enhanced by the inclusion of a cooling means for example a heat exchanger at deck or support level in the dielectric liquid circuit.

The circulating dielectric liquid may also be used to rotate the pump slowly when this is not being driven by the motor in order to ensure continuous lubrication of bearings and to reduce possibilities of seaweed growth in the pump section.

Figure 1:
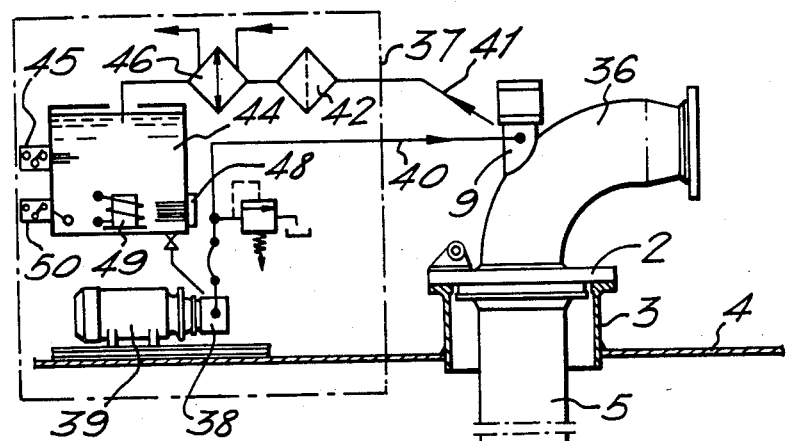
FIG. 1 is a side view of an illustrative electrically driven submersible pump system embodying the invention, parts of which are shown schematically.
Figure 1:
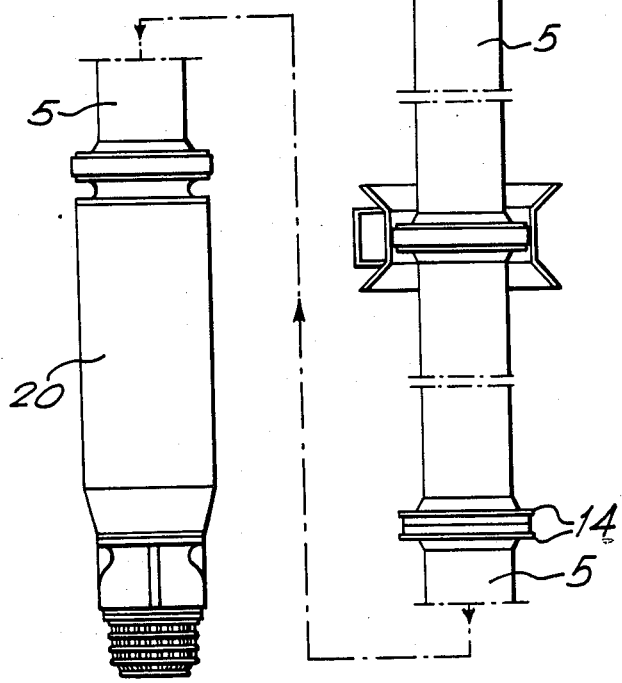
Figure 2:
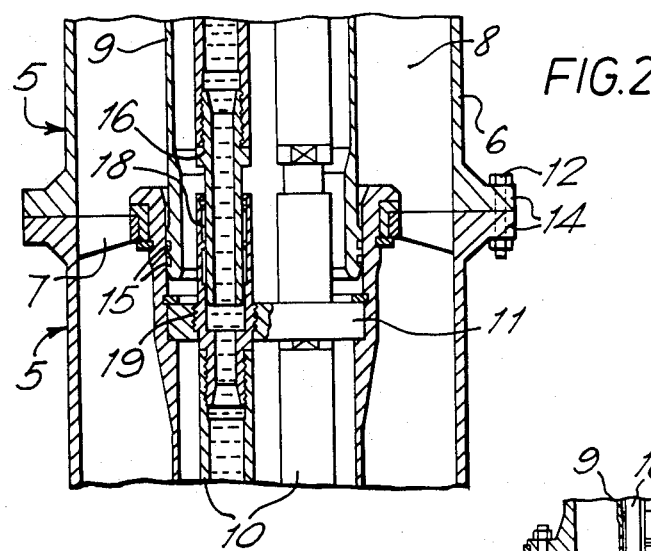
FIG. 2 is a part-sectional side view of a first form of connection between sections of a pipe stack included in the pump system of FIG. 1.
Figure 3:
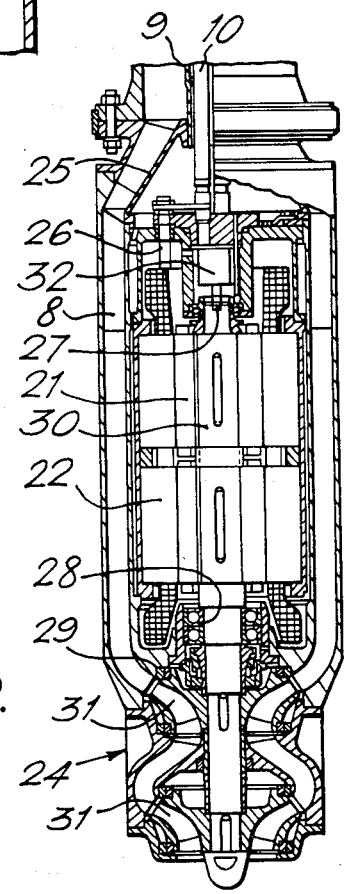
FIG. 3 is a part sectional view of a pump head included in the pump system of FIG. 1.

The electrically driven submersible pump system illustrated in FIGS. 1–3 includes a generally upright pipe stack 1 having a support flange 2 by which it is supported from a trunk 3 projecting upwardly from the deck 4 of a ship or an off-shore installation. The pipe stack consists of a plurality of sections 5 connected end to end, of which four are shown, with a pump head 20 at the lower end. Each section 5 is of no greater length than is convenient for handling, so that the pipe stack can be built up in the required length in a convenient manner.

As shown in FIG. 2, each pipe stack section 5 comprises an outer pipe 6 which provides the necessary load bearing strength of the pipe stack. The outer pipe 6 defines the outer periphery of a pump head discharge duct 8 of annular cross-section, the inner periphery being defined by a cofferdam protection pipe 9 within which extend a plurality of electric power supply conductors 10. Two conductors 10 are shown; the number provided will depend on the nature of the electric power supply. The conductors 10 are tubular and may comprise for example copper pipes. Their interiors provide a pressure line for a dielectric liquid which can be continuously circulated through them, the return line being provided by the space between the conductors and the pipe 9. The conductors 10 are spaced from each other and the wall of the pipe 9 by means of spacers 11 of insulating material which are apertured to permit the dielectric liquid to flow through them. The conductors may be individually insulated by sleeves of insulating material but this is not essential because of the insulation provided by the dielectric liquid.

The outer pipes 6 of the sections 5 of the pipe stack are connected together by means of bolts at 12 extending through out-turned end flanges 14, appropriate sealing means being associated with the flanges. The pipe 9 of the upper section 5 is formed at its lower end as a spigot releasably received in a socket portion formed at the upper end of the pipe 9 of the lower section. An apertured spacer member 7 holds the pipe 9 concentrically within the pipe 6. A double O-ring seal 15 is provided to seal the interior of the pipe 9 from the duct 8.

The lower end of each conductor 10 of the upper pipe stack section 5 has an end member 16 with the form of a spigot which makes a sliding connection within a sleeve 18 received within a socket-forming end-piece 19 of the conductor 10 in the lower section. The sleeve 18 is sealed to the end-piece 19 at its outer end by an O-ring and is provided with a large number of resiliently projecting pads by the sleeve makes good electrical contact with the member 16 and the end-piece 19. At the upper end of the upper pipe stack portion 5, the pipe 9 and the conductors 10 are of course provided with socket portions for releasable connection with a pipe stack portion thereabove.

At the lower end of the pipe stack 1, the pump head 20 has an upper chamber containing an electric motor with a rotor 21 and a stator 22, and an impeller section 24 below this. At the top of the pump head, the cofferdam pipe 9 has an outwardly flared portion 25 defining the outer limit of the motor chamber in which the conductors 10 are connected to windings of the stator 22 by means of a connecting bar 26. The interiors of the conductors 10 communicate with the motor interior, to carry the downwardly flowing dielectric liquid, which is an oil having lubricating properties, to rugged upper and lower bearings 27,28 by which the rotor of the electric motor is journalled. The dielectric liquid is thus circulated through the bearings 27, 28 to provide continuous lubrication. From the lower end of the motor interior, the dielectric liquid is directed radially outwardly and it then returns upwardly to the space between the conductors 10 and the cofferdam pipe 9 through passages provided between the motor and motor chamber wall. All bearings which require continuous lubrication are within the motor chamber, which is separated from the pump section 24 by a seal 29 through which the motor shaft 30 extends downwardly into the pump section to drive two impellers 31 in the impeller section 24 for pumping surrounding liquid upwardly through the discharge duct 8.

From FIGS. 1 and 2, it will be seen that the outer pipe 6 is continued above the flange 2 by a curved pipe section 36 for communicating the duct 8 with appropriate discharge means, and that the cofferdam protection pipe 9 extends upwardly out of this curved section, for connection of the conductors 10 to an electrical supply source (not shown) and for connection of the interiors of the conductors and the pipe 9 to a deck mounted installation 37 having further elements of the dielectric liquid circuit, shown schematically.

The circulation of the dielectric liquid is effected by a pump 38 of the installation 37, driven by an electric motor 39, through a supply line 40 to the conductors 10. The return line 41 from the pipe 9 is taken first to filter 42 for removal from the return flow of impurities and particles due to wear in the pump head. An indication of the condition of the pump head 20 can be obtained by monitoring the particles in returning dielectric liquid extracted by the filter 42.

It will be evident that the continuous circulation of the dielectric liquid during operation will remove heat from the electric motor 22. The tubular configuration of the conductors 10 provides the dielectric liquid circuit with a considerable cooling. The return flow line 41 leads to a reservoir 44 at which the temperature of the dielectric liquid can be monitored by a thermometer 45 which can be associated with a temperature responsive circuit breaker for stopping the power supply to the motor 22 when a predetermined temperature level has been reached due to abnormal heat production in the pump head. Normally there is sufficient heat exchange between the cofferdam protection pipe 9 and its surroundings to remove excess heat from the motor even when the submerged pump is unable to move the liquid in the discharge duct, but if need be the returning dielectric liquid can be colled by a cooling device such as the illustrated heat exchanger 46. To limit heat transfer into the dielectric liquid from pumped fluid in the duct 8 at a higher temperature, thermal insulation can be associated with the cofferdam pipe. On the other hand, a thermostatically controlled electric heater 48 can be associated with the reservoir 44 to maintain optimum temperature of the dielectric liquid where low ambient temperatures are experienced at the installation 37 or at the submerged pump head 20.

Where the voltage to be applied to the pump head motor 22 differs from that of the supply, a transformer 49 of the oil bath type can be placed within the reservoir 44.

The pump 38 circulates the dielectric liquid at a pressure which is greater than that of the discharge pressure due to the submerged pump, so that liquid in discharge pipe 8 cannot enter either the pipe 9 or the motor chamber 21. If any leak occurs it will be of dielectric liquid outwardly from the dielectric liquid circuit. Any such loss can be monitored by a level sensitive device 50 in the reservoir 44. A level responsive device may be arranged to indicate any substantial loss of the dielectric liquid, and to break the electric power supply to the submerged pump if the liquid falls below a predetermined level in the reservoir 44.

The upper end of the motor shaft 30 may be provided with vanes by which the shaft and thus also the impellers 31 are slowly rotated by the flow of the dielectric liquid in the motor chamber in the absence of a power supply to the motor. This reduces the possibility of marine growth in the impellers during periods of inactivity when the pump system is used for pumping sea water.

Instead of providing such vanes on the motor shaft 30, the pump head can include a pump unit 32 connected to the upper end of the shaft and arranged to receive therethrough the flow of dielectric liquid from the conductor 10. When the pump motor is in operation, the unit 32 circulates the dielectric liquid and the pump 38 can be inactive or even omitted from the system. If the pump 38 is included, the unit 32 can take the form of a pump/motor unit, which turns the motor shaft slowly, when the motor is inoperative, because of the flow through it of the dielectric liquid.

Figure 4:
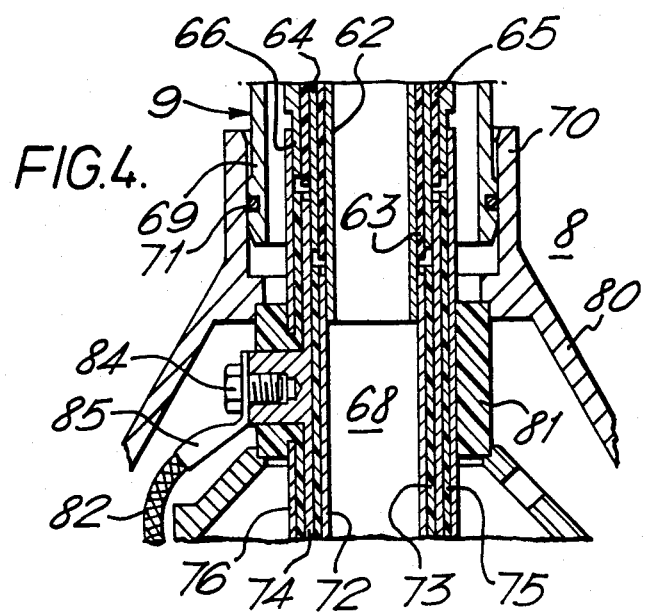
FIGS. 4 and 5 are views resembling that of FIG. 2 respectively of second and third alternative forms of connection between pipe stack sections.

The releasable connection illustrated in FIG. 4 is located at the join of two sections 5 of a pipe stack in a submersible pump system which may otherwise be in accordance with the system of FIG. 1. The cofferdam pipe 9 in the upper pipe stack section 5 of FIG. 4 surrounds a conductor pipe comprising three concentric tubular conductors 62,64,66, for example of copper, of which the central conductor 64 is electrically insulated from the inner and outer conductors 62,66 by inner and outer sleeves 63,65 of solid insulating material, for example a plastics dielectric material. The interior 68 of the inner conductor 62 is employed to convey dielectric liquid downwardly to the electric motor in the pump head 20 and the return path for the liquid is between the outermost tubular conductor 66 and the cofferdam pipe 9.

The lower end portion 69 of the cofferdam pipe 9 of the upper pipe stack section 5 is received within a larger diameter end portion 70 of the cofferdam pipe of the lower pipe stack section, with a sealing ring 71 operative between the end portions. The outer conductor 66 of the upper pipe stack section terminates slightly short of the solid insulating sleeve 65 between it and the central tubular conductor 64, which itself extends a substantial distance beyond this sleeve 65. The insulating sleeve 63 between the central conductor 64 and the innermost conductor 62 terminates slightly beyond the central conductor, and the innermost conductor extends a substantial distance beyond that sleeve.

At the upper end of the lower section, three concentric conductor tubes 72,74,76 and intervening insulation sleeves 73,75 display a contrary configuration, that is, the outer conductor tube 76 extends a substantial distance beyond the adjacent insulating sleeve 75 between it and the central conductor 74, which ends just short of this sleeve. The diameters of the tubular conductors are such that conductor 66 makes a sliding frictional fit within the conductor 76, and the conductors 64,74 and 62,72 are similarly related. The protrusion of each insulating sleeve beyond the adjacent conductor which it surrounds ensures that effective insulation is maintained between the conductors at the connection. The sliding frictional fit made between the conductors of the two pipe stack sections ensures electrically continuity along the pipe stack, without substantial added electrical resistance at the connections.

The connection arrangements of the invention are of course provided not only between like intermediate sections of the pipe stack 1 but also between such sections and the curved section 36 and the pump head 20. The lower pipe stack section shown in FIG. 4 is the upper end of the pump head 20, and to accommodate the electric motor 22, the cofferdam pipe in this pipe stack section is flared outwardly at 80, electrical connection being made through a terminal box 81 which serves also as a spacer between the cofferdam pipe and the conductor pipe. A connection through the terminal box 81 from the central conductor 74 to a motor supply cable 82 is illustrated. The box 81 comprises insulating material integral with the insulating sleeve 75, through which extends a radially outward extension of the conductor 74 which is tapped for the reception of a terminal bolt 84 extending through an end piece 85 of the cable 82.

The conductors 62,64,66 are not held in rigid relationship to the cofferdam pipe 9 immediately adjacent the lower end of the pipe stack portion, so that any minor departure from concentricity of the conductors and cofferdam pipe of the lower pipe stack section can be readily accommodated during assembly.

It will be noted that the cofferdam pipe end portion 69 is not shown in FIG. 4 as being fully received into the cofferdam pipe portion 70, and that the conductors 62,64,66 are in a similar relationship to the conductors 72,74,76. Relative changes of length of the various concentric components of the pipe stack sections in response to temperature changes is thus accommodated. The central core of the pipe stack constituted by the cofferdam pipe and the conductors can thermally expand and contract independently of such expansion and contraction of the outer tube.

Figure 5:
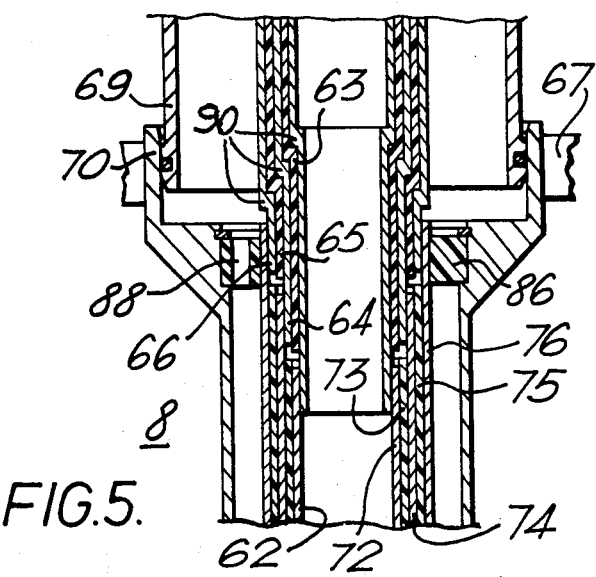

FIG. 5 shows a connection similar to that of FIG. 4, and like parts are given the same reference numerals as are used in FIG. 4. The lower pipe stack section does not in this instance include a motor, so the conductor pipe is held in concentric relationship with the cofferdam pipe by a spacer 86 apertured at 88 to permit the return flow of the dielectric oil. To enable the conductors of the upper pipe section to be received within those of the lower pipe stack section, the former are stepped inwardly as shown at 90.

If the pump and the deck installation are exposed to a fire hazard, a dielectric liquid with fire resistant properties can be selected.

The invention can be embodied in various ways other than as specifically described, for example, the illustrated configurations of the pipe stack sections 5 can be substantially modified. The discharge pipe and a cofferdam protection pipe for the conductors could be arranged side by side, if need be within an outer stilling pipe or in association with one or more guides. The conductors can be solid rod or cable, the protection pipe being then partitioned to provide pressure and return lines for the dielectric liquid, or an inner conductor can be surrounded by one or more outer tubular conductors providing passages for the flow and return of the dielectric liquid.

I claim:

1. For use in the pipe stack of a submersible pump system having a pump head with an electrically driven drive means for an impeller at the lower end of the said pipe stack, a pipe stack section comprising:
   a guide pipe defining a duct for guiding a fluid pumped by the system,
   a plurality of electrical conductors for conveying electrical power to said pump head drive means, and
   a further pipe located around said conductors with clearance for dielectric liquid for insulation of said conductors,
   each of said guide pipe, said further pipe and said conductors being adapted, at each end of said pipe section, for releaseable connection respectively with a guide pipe, a further pipe, and conductors of co-operating pipe stack sections, whereby said pipe stack can be assembled in a desired length from a selected plurality of said pipe stack sections, said conductors and said further pipe cooperating to define a supply path and a return path along said section for circulation of dielectric liquid in said pipe stack, each of said plurality of conductors comprising a tubular conductor of which the interior provides one of said supply and return paths, the other of said supply and return paths being defined between said tubular conductors and said further pipe.

2. The pipe stack section means of claim 1 wherein each tubular conductor has a spigot shaped end piece at one end of said pipe stack section and a socket shaped end piece at the other end of said pipe stack section, said end pieces being adapted for releaseable connection respectively with socket and spigot shaped end pieces of tubular conductors of adjoining co-operating pipe stack sections.

3. For use in the pipe stack of a submersible pump system having a pump head with an electrically driven drive means for an impeller at the lower end of the said pipe stack, a pipe stack section comprising:
   a guide pipe defining a duct for guiding a fluid pumped by the system;
   a plurality of electrical conductors for conveying electrical power to said pump head drive means, and
   a further pipe located around said conductors with clearance for dielectric liquid for insulation of said conductors,
   each of said guide pipe, said further pipe and said conductors being adapted, at each end of said pipe section, for releaseable connection respectively with a guide pipe, a further pipe, and conductors of co-operating pipe stack sections, whereby said pipe stack can be assembled in a desired length from a selected plurality of said pipe stack sections, said conductors comprising a plurality of concentric tubular conductors and solid dielectric material disposed therebetween, the ends of the conductors being relatively staggered at each end of said pipe stack section, whereby each conductor can be slidably received within a respective conductor of a co-operating pipe stack section of which the ends are relatively staggered in the contrary sense from those of said first-mentioned pipe stack section.

4. The pipe stack section of claim 3 wherein said solid dielectric material extends to a position between the ends of said conductors between which said dielectric material is disposed, thereby to ensure effective insulation between said conductors in the connection condition.

5. A submersible pump system comprising:
   a pipe stack support,
   a pipe stack suspended from said pipe stack support,
   a pump head containing an impeller and electric drive means for driving said impeller, said pump head being located at the lower end of said pipe stack,
   electrical supply means for supplying power to said electric drive means, said electrical supply means comprising electrical conductors, a pipe member surrounding the electrical conductors and means providing supply and return paths within said pipe member for dielectric liquid providing insulation for said electric conductors, and
   means for circulating dielectric liquid along said supply and return paths,
   at least one of said electrical conductors being hollow and having inner and outer surfaces that define at least a portion of said supply and return paths, whereby dielectric liquid passes in one direction on the inside of said at least one electrical conductor and in the opposite direction on the outside of said at least one electrical conductor.

6. The pump system of claim 5 wherein said pipe stack comprises a plurality of separable pipe stack sections.

7. The pump system of claim 6 wherein said electric drive means comprises an electric motor having motor bearings, wherein said dielectric liquid is a lubricant, and wherein means is provided for guiding dielectric fluid through said electric drive means to lubricate said motor bearings.

8. The pump system of claim 7 further comprising means responsive to characteristics of dielectric liquid when recirculated from said electric drive means to indicate at least one electric drive means characteristic.

9. The pump system of claim 5 further comprising cooling means for cooling circulated dielectric liquid.

10. The pump system of claim 5 wherein said electric drive means is drivingly connected to a pump for at least assisting said circulation of dielectric liquid.

11. The pump system of claim 10 wherein said pump is adapted to function as a motor responsive to the circulation of dielectric liquid to rotate said electric drive means in the absence of an electric power supply thereto.

12. The pump system of claim 5 in combination with dielectric liquid.

* * * * *